(12) United States Patent
Olenberger et al.

(10) Patent No.: US 11,637,445 B2
(45) Date of Patent: Apr. 25, 2023

(54) METHOD FOR OPERATING AN ELECTRIC ISLAND POWER NETWORK

(71) Applicants: Fraunhofer-Gesellschaft zur Förderung der angewandten Forschung e.V., Munich (DE); MAN Energy Solutions SE, Augsburg (DE)

(72) Inventors: Christian Olenberger, Sankt Augustin (DE); Björn Häckel, Sankt Augustin (DE); Stephan Berger, Augsburg (DE); Michael Raila, Buchdorf (DE)

(73) Assignee: FRAUNHOFER-GESELLSCHAFT ZUR FORDERUNG DER ANGEWANDTEN FORSCHUNG E. V. MAN ENERGY SOLUTIONS SE, Munich (DE)

( * ) Notice: Subject to any disclaimer, the term of this patent is extended or adjusted under 35 U.S.C. 154(b) by 191 days.

(21) Appl. No.: 17/178,221

(22) Filed: Feb. 17, 2021

(65) Prior Publication Data
US 2021/0257853 A1    Aug. 19, 2021

(30) Foreign Application Priority Data

Feb. 19, 2020    (DE) ................. 10 2020 104 324.4

(51) Int. Cl.
*H02J 13/00* (2006.01)
*H02J 3/38* (2006.01)
*H02J 1/14* (2006.01)

(52) U.S. Cl.
CPC .......... *H02J 13/00002* (2020.01); *H02J 1/14* (2013.01); *H02J 3/388* (2020.01); *H02J 2300/24* (2020.01); *H02J 2300/28* (2020.01)

(58) Field of Classification Search
CPC ........ H02J 13/00002; H02J 1/14; H02J 3/388; H02J 2300/24; H02J 2300/28; H02J 3/381;
(Continued)

(56) References Cited

U.S. PATENT DOCUMENTS

| 2014/0103727 | A1  | 4/2014 | Taimela et al. |
| 2015/0039145 | A1* | 2/2015 | Yang ......................... H02J 3/00 700/291 |

(Continued)

FOREIGN PATENT DOCUMENTS

| DE | 102015101738 | 8/2016 |
| EP | 1 485 978    | 2/2003 |

(Continued)

OTHER PUBLICATIONS

Hernandez-Aramburo et al. "Fuel Consumption Minimization Of A Microgrid," In: IEEE Transactions on Industry Applications, vol. 41, No. 3, 2005, pp. 673-681.

(Continued)

*Primary Examiner* — Mohammad Ali
*Assistant Examiner* — Dhruvkumar Patel
(74) *Attorney, Agent, or Firm* — Cozen O'Connor

(57) ABSTRACT

A method for operating an electric island power network having a renewable energy generation plant, a conventional energy generation plant, an energy store, and an energy consumer, includes: defining first operating parameters for the network for when a frequency and/or voltage of the network is outside defined limits; operating the network using the first operating parameters causing the frequency and voltage of the network to both be within the defined limits; defining second operating parameters for the network after the expiration of a defined time span over which the frequency and voltage have remained within the defined (Continued)

limits, the second operating parameters being defined such that operating the network using the second operating parameters causes the network to operate cost-optimally. If verified that the second operating parameters ensure that the frequency and voltage remain within the defined limits, operation using the second operating parameters is maintained. Otherwise, it is discontinued.

8 Claims, 2 Drawing Sheets

(58) Field of Classification Search
CPC .. H02J 3/472; H02J 3/28; Y02E 10/56; Y02E 70/30
See application file for complete search history.

(56) References Cited

U.S. PATENT DOCUMENTS

| | | | |
|---|---|---|---|
| 2016/0077507 A1 | 3/2016 | Sheble | |
| 2016/0313716 A1* | 10/2016 | Chen | H02J 4/00 |
| 2016/0329713 A1* | 11/2016 | Berard | H02M 5/04 |
| 2017/0187188 A1* | 6/2017 | Aubert Guyon | H02J 3/48 |
| 2018/0248374 A1* | 8/2018 | Jung | H02J 3/38 |
| 2019/0140477 A1* | 5/2019 | Yang | H02J 3/48 |
| 2019/0190274 A1* | 6/2019 | Fazeli | H02J 7/35 |
| 2019/0296551 A1* | 9/2019 | Kawachi | H02J 3/18 |

FOREIGN PATENT DOCUMENTS

| | | |
|---|---|---|
| EP | 3 028 358 | 7/2014 |
| ER | 1 323 222 | 9/2001 |
| WO | WO 2016/109330 | 7/2016 |

OTHER PUBLICATIONS

Office Action dated Aug. 18, 2020 issued in German Patent Application No. 10 2020 104 324.4.
Search Report dated Jul. 6, 2021 issued in European Patent Application No. 21157007.2.

* cited by examiner

METHOD FOR OPERATING AN ELECTRIC ISLAND POWER NETWORK

BACKGROUND OF THE INVENTION

1. Field of the Invention

The invention relates to a method for operating an electric island power network.

2. Description of the Related Art

An electric island power network is a locally limited power network which comprises energy generation plants based on renewable energy sources such as wind and sun, energy generation plants based on conventional energy sources such as fossil fuels, energy stores and energy consumers, wherein such an island network typically supplies a narrowly confined region with electric current and does not have any direct electrical connection to other power networks. Basically there is a need for operating such an island power network both in a network-stable and also cost-optimal manner. An electric island power network is also referred to as micro-grid.

From EP 1 323 222 B1 a method for operating an electric island power network is known, which, as energy generation plants based on renewable energy sources, comprises a wind turbine and, as energy generation plants based on conventional energy sources, comprises an internal combustion engine. Furthermore, an electric intermediate store is present. The wind energy plant is operated so that it always generates only the necessary electric power, wherein the necessary electric power is composed of the consumption of the electric power in the network and the power requirement for charging the intermediate store. The internal combustion engine is only switched on in particular when the power output by the wind energy plant and/or the intermediate stores falls below a predeterminable threshold value for a predeterminable time period.

From EP 1 485 978 B1 a further method for operating an electric island power network is known, which in turn comprises energy generation plants based on renewable energies, namely wind energy plants. The respective wind energy plant is operated such that it always generates only necessary electric power in the case that the consumption of the electric power in the network is lower than the electric energy generation capacity of the wind energy plant.

EP 3 028 358 B1 discloses a further method for operating an electric island power network. Here, the island power network is operated such that a cost function is minimal. In this manner, a cost-optimal operation of an electric island power network is then possible.

There is a need for a new type of method for operating an electric island power network which makes possible both a network-stable operation of the island power network and also a cost-optimal operation of the same.

SUMMARY OF THE INVENTION

Starting out from this, it is an object of the invention to create a new type of method for operating an electric island power network.

This object may be achieved through a method for operating an electric island power network as set forth below.

With the method according to an aspect of the invention, first operating parameters for the island power network are defined in an event-controlled manner, namely in particular when a frequency of the island power network and/or a voltage of the island power network is outside defined limits, such that the frequency of the island power network and the voltage of the island power network are brought within the defined limits.

In particular when the frequency of the island power network and the voltage of the island power network are within the defined limits, second operating parameters for the island power network are defined in a time-controlled manner, namely following the expiration of a defined time span, in such a manner that the island power network is operated cost-optimally.

Following the definition of the second operating parameters for the cost-optimal operation of the island power network it is checked whether these second operating parameters ensure that the frequency of the island power network and the voltage of the island power network are still within the defined limits, wherein in particular when such is the case, the second operating parameters are used for operating the island power network, whereas in particular when this is not the case, the second operating parameters are not used for operating the island power network.

With the method according to the invention it is proposed to define first operating parameters for the island power network in an event-controlled manner, which make possible a network-stable operation of the network, in order to keep the frequency and the voltage of the electric island power network within defined limits. These operating parameters are always newly defined in particular when the frequency of the island power network and/or the voltage of the island power network are/is outside the defined limits.

In particular when the frequency of the island power network and the voltage of the island power network are within the defined limits, i.e., when a network-stable operation of the electric island power network is present, the second operating parameters are defined in a time-controlled manner in order to cost-optimally operate the island power network. These second operating parameters are always newly determined after expiration of a defined time span taking into account the respective current operating conditions of the island power network.

After the definition of the second operating parameters for the cost-optimal operation it is checked whether these second operating parameters still ensure a network-stable operation of the island power network taking into account the operating conditions present according to the determination still ensure a network-stable operation of the island power network, whether the frequency and the voltage are still within the defined limits. Only when this is the case are the second operating parameters used for operating the island power network.

Accordingly, a network-stable operation has priority over a cost-optimal operation. In this way, an electric island power network can be particularly advantageously operated, namely on the one hand in a network-stable and on the other hand in a cost-optimal manner.

According to an advantageous further development, the first operating parameters for ensuring a balance between a requested electric power and an available electric power are determined prioritizing the energy generation plants and energy stores preferentially such that the requested electric power comprises an active power component and a reactive power component, that initially all power potentials of the at least one energy generation plants based on renewable energy sources, then power potentials of the at least one energy store and required power potentials of at least one energy generation plant based on conventional energy sources are utilized for providing the active power component of the requested electric power, wherein this leads to a provided reactive power. In particular when the reactive power so provided deviates from the reactive power component of the requested electric power by more than a limit value, the provided reactive power is adjusted by changing the operation of at least one energy store so that the provided reactive power does not deviate from the reactive power component of the requested electric power by more than the limit value, so that the frequency of the island power network and the voltage of the island power network are then within the defined limits.

This definition of the first operating parameters utilizes heuristic methods and can thus take place in real time for balancing the supply of electric power and demand of electric power in the island power network. When determining the first operating parameters, no economic factors are incorporated and the only consideration is whether a requested electric power, with respect to active power and reactive power, can be provided in a network-stable manner.

According to an advantageous further development, the second operating parameters are determined by optimizing a cost function preferentially such that upon the optimization the at least one energy generation plant based on renewable energy sources is always maximally utilized for providing the requested electric power and regarding the cost function, the costs of the at least one energy generation plants based on renewable energy sources remain out of consideration.

For determining the second operating parameters a cost function is optimized. Accordingly, economic factors are taken into account here. Such an optimization of a cost function is computation-intensive and can take several minutes. For this reason, it is checked after the determination of the second operating parameters whether the second operating parameters ensure a network-stable operation of the electric island power network even under those operating conditions that are present following the determination of the second operating parameters in the island power network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the following description. Exemplary embodiments of the invention are explained in more detail by way of the drawings without being restricted to this. In the Figures.

DETAILED DESCRIPTION OF THE PRESENTLY PREFERRED EMBODIMENTS

Figure 1:
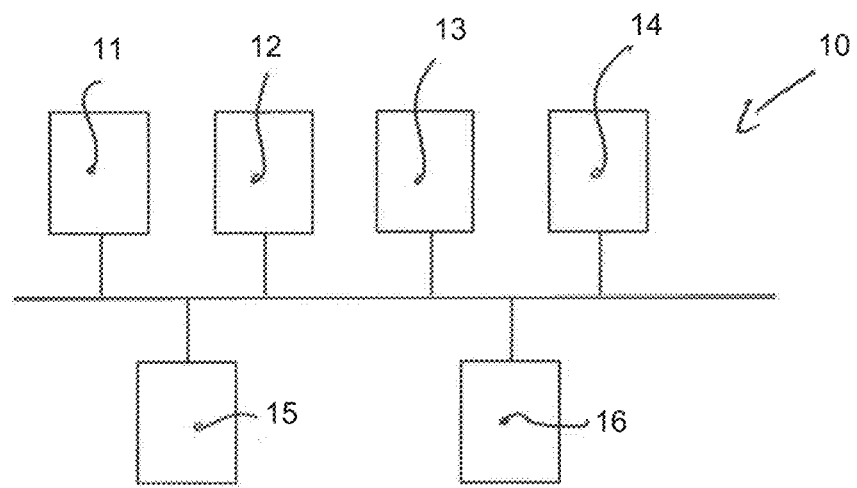
FIG. 1 is a highly schematic representation of an electric island power network.

FIG. 1 shows highly schematically the structure of an electric island power network 10. The electric island power network 10 of FIG. 1 comprises at least one wind energy plant 11, at least one solar energy plant 12, at least one energy generation plant 13 based on conventional energy sources and at least one energy store 14.

The wind energy plant 11 and the solar energy plant 12 are energy generation plants based on renewable energy sources. The, or each, energy generation plant 13 based on conventional energy sources can be an internal combustion engine or a gas turbine. The energy store (storage) 14 can be an electric energy store, e.g., a battery or the like.

Furthermore, the island power network comprises energy consumers, in the shown exemplary embodiment two energy consumers 15, 16.

In order to optimally operate an island power network 10, first operating parameters for the island power network 10 are defined in an event-controlled manner, namely in particular when a frequency of the island power network 10 and/or a voltage of the island power network 10 is outside defined limits, namely such that the frequency of the island power network 10 and the voltage of the island power network 10 are within the defined limits, i.e., that a network-stable operation of the island power network 10 is possible.

Figure 2:
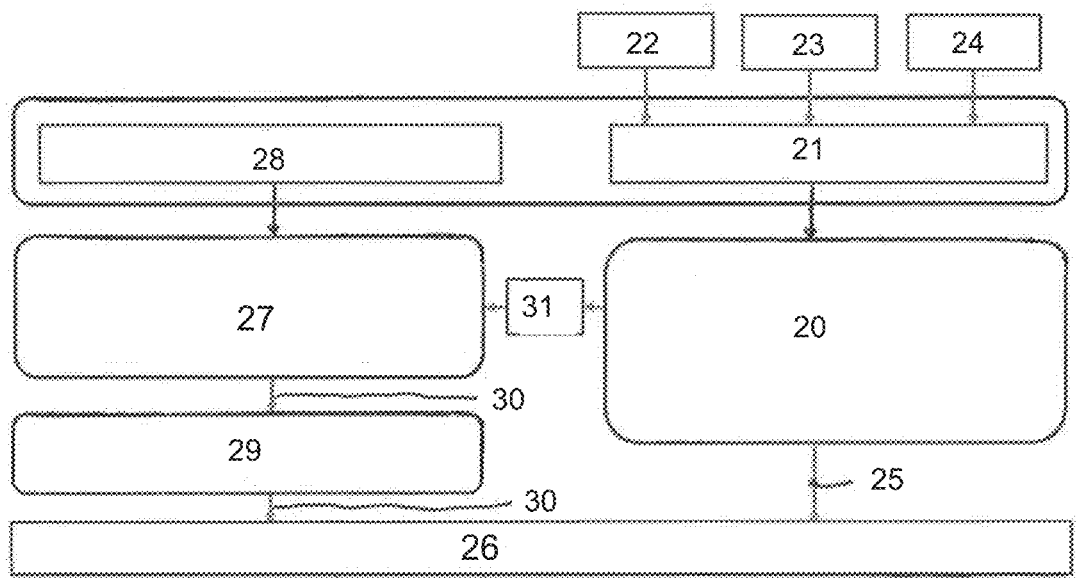
FIG. 2 is a first block diagram for illustrating the method according to an aspect of the invention for operating an electric island power network.

In the block diagram of FIG. 2, a block 20 represents the determination of the first operating parameters for the island power network 10, which ensure that the frequency of the island power network 10 and the voltage of the island power network 10 are within defined limits.

As already explained above, the definition of the first operating parameters takes place in an event-controlled manner, namely always in particular, when during the current operation of the island power network 10, the frequency of the island power network 10 and/or the voltage of the island power network 10 are outside the defined limits, accordingly when the island power network leaves the network-stable operation. In order to verify this, i.e., in order to establish whether the frequency and/or the voltage of the island power network are/is outside defined limits, a block 21 of FIG. 2 is provided with input quantities, namely according to the block 22 an actual frequency of the island power network 10, according to the block 23 an actual voltage of the island power network 10 and if required according to the block 24, further actual operating conditions of the island power network 10.

In the block 21 it is checked whether the actual frequency of the block 22 and the actual voltage of the block 23 are within defined limits, i.e., whether a network-stable operation of the island power network 10 is present. When this is the case, there is, emanating from block 21, no branching out to block 20, and the island power network 10 can then continue to be operated under the current operating parameters. When however it is established in block 21 that the island power network 10 leaves a network-stable operation, i.e., that the frequency and/or the voltage of the island power network 10 are/is outside defined limits, there is, emanating from block 21, a branching out to block 20, wherein in block 20 the first operating parameters 25 are then defined in order to subsequently make possible a network-stable operation of the island power network 10, wherein these first operating parameters 25 are passed on from block 20 as output quantities to a controller 26, which then operates the island power network 10 based on these first operating parameters

25 of the block 20, so that the frequency and the voltage of the island power network 10 are then within the defined limits.

In particular when the frequency and the voltage of the electric island power network 10 are within the defined limits, second operating parameters 30 for the island power network 10 are defined in a time controlled manner, namely always after expiration of a defined time span, in such a manner that the island power network 10 is cost-optimally operated.

The determination of the second operating parameters 30 for the island power network 10 for the cost-optimal operation of the island power network 10 takes place in the block 27 of FIG. 2. A block 28 illustrates the time control which triggers the determination of the second operating parameters in block 27. Always after expiration of a defined time span, which is monitored in block 28, the determination of the second operating parameters for the cost-optimal operation of the island power network is triggered in block 27.

Following the definition of the second operating parameters 30 for the cost-optimal operation of the island power network 10 in block 27, it is checked in a block 29 whether these second operating parameters 30 still ensure a network-stable operation of the island power network 10 taking into account the operating conditions of the island power network 10 that are valid according to the definition of the second operating parameters 30, i.e., whether the frequency of the island power network 10 and the voltage of the same, utilizing these second operating parameters 30, are still within the defined limits.

Only, in particular when this is the case, are the second operating parameters 30 made available to the controller in order to then operate the island power network on the basis of these.

When however it is determined in block 29 that the second operating parameters 30 following definition of the second operating parameters 30 taking into account the current operating conditions does not ensure a network-stable operation of the island power network 10, the second operating parameters 30 are rejected and the island power network 10 continues to be operated based on the first operating parameters 25.

A block 31 of FIG. 2 illustrates a time delay namely such that following renewed definition of the first operating parameters 25 in block 20, as a consequence of an operation of the island power network 10 that is not network-stable detected in block 21, a defined waiting time is implemented, until in block 27 the second operating parameters 30 for the cost-optimal operation of the island power network 10 are defined. When, accordingly, the time delay of the block 31 is still active, the time control of the block 28 is suppressed.

As already explained, the first operating parameters 25 for the island power network 10 are defined in block 20 in an event-controlled manner, namely in particular when the frequency of the island power network 10 and/or the voltage of the island power network 10 are outside defined limits, in order to operate the island power network 10 in a network-stable manner based on these first operating parameters 25, so that accordingly the frequency and the voltage of the island power network 10 are within the defined limits. In the process, the first operating parameters 25 in block 20 are determined ensuring a balance between a requested electric power in the island power network 10 and an available electric power in the island power network 10 prioritizing the energy generation plants 11, 12, 13 and the energy stores 14. This takes place preferentially as described in the following making reference to FIG. 3.

Figure 3:
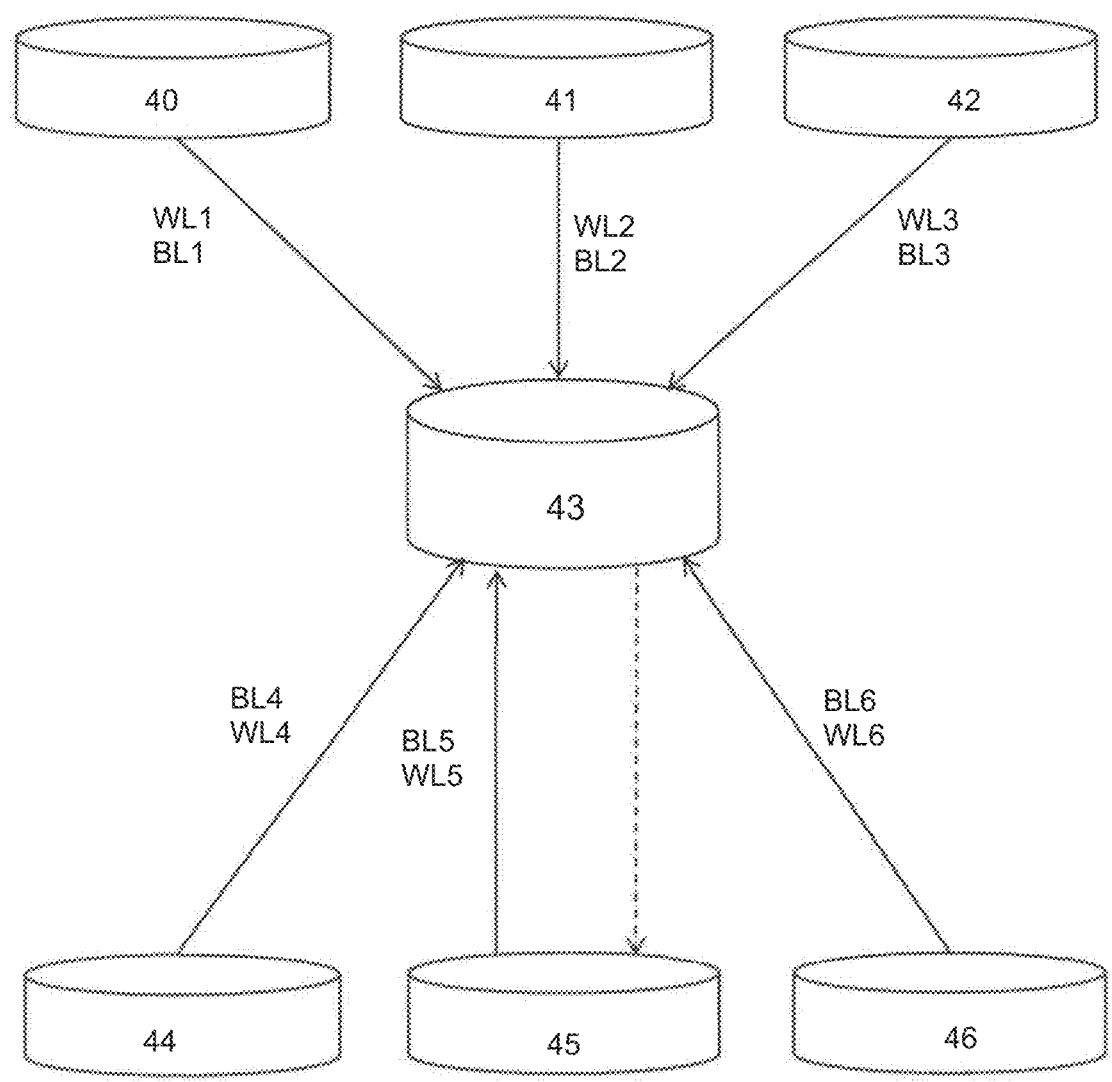
FIG. 3 is a second block diagram for illustrating the method according to the invention for operating an electric island power network.

Accordingly, a block 40 in FIG. 3 illustrates an electric power requested from a first energy consumer 15, which on the one hand has an active power component WL1 and on the other hand a reactive power component BL1. A block 41 illustrates a second electric power requested by a second energy consumer which likewise comprises an active power component WL2 and a reactive power component BL2. A block 42 illustrates a power reserve of the island power network 10 that may be necessary, which is likewise characterized by an active power component WL3 and a reactive power component BL3.

These power requests 40, 41 and 42 add up to a total power request 43 to the electric island power network.

In the block 20, this total power request 43 to the island power network 10 is divided over the energy generation plants 11, 12 based on renewable energy sources, over the energy generation plant 13 based on conventional energy sources and over the energy stores 14, namely prioritizing the energy generation plants and the energy store, wherein the energy generation plants 11, 12 based on renewable energy sources are utilized with a higher priority for providing the requested electric total power 43 than the energy stores 14, and wherein the energy stores 14 in turn are utilized with a higher priority for providing the requested electric total power 43 than energy generation plants 13 based on conventional energy sources.

In FIG. 3, a block 44 illustrates the power potential of the energy generation plants 11, 12 based on renewable energy sources, a block 45 illustrates a power potential of the energy stores 14 and a block 46 illustrates a power potential of the energy generation plants 13 based on conventional energy sources, wherein these power potentials in turn are characterized by active power outputs WL4, WL5 and WL6 as well as reactive power outputs BL4, BL5 and BL6.

In block 20, the power potentials of the energy generation plants 11, 12 based on renewable energy sources are initially utilized, then power potentials of the energy stores 14 and if necessary, power potentials of the energy generation plants 13 based on conventional energy sources for providing the active power component of the requested total power 43, which is composed of the active power components WL1, WL2 and WL3, wherein this then leads to a reactive power provided by the energy generation plants 11, 12, 13 and the energy stores 14.

In particular when the reactive power thus provided deviates from the reactive power component of the requested electric power, which is composed of the reactive power components BL1, BL2 and BL3, by more than a limit value, the reactive power provided the energy generation plants 11, 12, 13 and the energy store 14 is adjusted by a change of the operation of at least one energy store 14, namely such that the reactive power provided by the energy generation plants 11, 12, 13 and the, or each, energy store 14, does not deviate from the reactive power component of the electric total power 43 requested by the consumers 15, 16 by more than the limit value, as a result of which it is then ensured that a network-stable operation is present, i.e., that the frequency of the island power network 10 and the voltage of the island power network 10 are within the defined limits.

In a concrete example, it is assumed that an electric power 40 with an active power component of 25 kW and a reactive power component of 15 kVar is requested by the first energy consumer 15. A power 41 with an active power component of 35 kW and a reactive power component of 5 kVar is requested by the second energy consumer 16. In the concrete example, no power reserve 42 is needed so that accordingly the active power component of the requested total power 43 is around 60 kW and the reactive power component around 20 kVar.

From the energy generation plants 11, 12 based on renewable energies, a power potential of 15 kW active power and 5 kVar reactive power can be provided. From the electric energy store 15, an active power component of 15 kW can be provided, namely with a reactive power component of 5 kVar. From the electric energy store 14, an active power component of 30 kW can be provided, namely with a reactive power component of 10 kVar.

Utilizing the active power component of 15 kW from the energy generation plants 11, 12, which are based on renewable energy sources, and the active power component of 30 kW of the electric energy store 14, an additional 15 kW active power component is accordingly still needed from the energy generation plant 13, which is based on conventional energy sources, in order to provide the requested active power component of 60 kW.

In the concrete exemplary embodiment it is assumed that the energy generation plant 13 based on convention energy sources provides a reactive power of 7 kVar for providing 15 kW active power. The sum of the provided reactive power outputs is then at 22 kVar, i.e., above the reactive power requirement of 20 kVar of the requested total power 43. In order to balance this, the operation of the electric energy store 14 is then adjusted so that the electric energy store 14 merely provides 8 kVar reactive power in order to then ensure the network-stable operation of the island power network 10.

The above determination of the first operating conditions 25, i.e., of the distribution of the requested electric total power 43 over the energy generation plants 11, 12 based on renewable energy sources, over the electric energy stores 14 and over the energy generation plants 13 based on conventional energy sources takes place heuristically, namely ensuring the balance between the requested electric power and the available electric power prioritizing the energy generation plants 11, 12, 13 and energy store 14. This determination of the first operating parameters 25 can take place within a very short time at real time speed.

The determination of the second operating parameters 30 in block 27 for the cost-optimal operation of the island power network 10 takes place by optimizing a cost function as already explained.

During this optimization, energy generation plants 11, 12, based on renewable energy sources, are always maximally utilized for providing the requested electric power and, with the cost function, the costs of the energy generation plants 11, 12 based on renewable energy sources are thus not taken into account. Accordingly, merely cost components for energy generation plants 13 based on conventional energy sources and for electric energy stores 14 are included in the cost function since energy generation plants 11, 12 based on renewable energy sources are always maximally utilized with highest priority.

In the case of energy generation plants 13 based on conventional energy sources, in particular the costs of fossil fuels, emission costs as well as maintenance and other operating costs are taken into account as costs. In the case of energy stores 14, in particular life cycle costs of the energy stores 14 are taken into account as costs, which are based on a reduction of the lifespan as a consequence of charging processes and discharging processes of the energy store 14.

Formulized relationships for cost functions are familiar to the person skilled in the art addressed here and known for example from EP 3 028 358 B1. It is incumbent on the person skilled in the art addressed here to utilize a suitable cost function for the optimization.

The optimization of the cost function constitutes a linear optimization problem wherein in solving the linear optimization problem an absolute minimum and not merely a local minimum of the cost function is wanted. This can take some minutes. During the calculation time needed for solving the linear optimization problem, the operating conditions in the island power network 10 can change in such a manner that the second operating parameters 30 determined during the solution of the linear optimization problem based on the old operating conditions no longer ensure a network-stable operation of the island power network 10.

For this reason, as already explained above, a verification is performed in block 29 as to whether, based on the second operating parameters 30 defined in block 27, a network-stable operation of the island power network is still possible, i.e., where the frequency and voltage of the island power network 10 are within the defined limits. Only in particular when this is the case are the second operating parameters 30 passed on to the control unit 26 for operating the island power network 10.

Accordingly, the method according to the illustrated aspect of the invention proposes an event-controlled definition of the first operating parameters 25 and a time-controlled definition of the second operating parameters 30 for the operation of the island power network 10. The first operating parameters 25 serve for providing a network-stable operation of the island power network 10, wherein the first operating parameters 25 are then determined when the island power network 10 leaves the network-stable operation. Within real time, the first operating parameters 25 can be defined so that the they ensure a network-stable operation of the island power network 10 namely, as explained above, utilizing heuristic methods balancing the requested electric power and the available electric power prioritizing the energy generation plants 11, 12, 13 and energy stores 14. In the process, no economic factors are taken into account. Only in particular when the island power network 10 operates in a network-stable manner and accordingly frequency and voltage are within the defined limits, does the determination of the second operating parameters 30 for the cost-optimal operation of the island power network 10 takes place in a time-controlled manner, namely always after the expiration of the defined time span, wherein in the process economic factors are included. Following the determination of the second operating parameters 30, the verification 29 is performed as to whether with the same a network-stable operation of the island power network 10 is still possible.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE LIST

10 Island power network
11 Energy generation plant
12 Energy generation plant
13 Energy generation plant
14 Energy store (storage)
15 Energy consumer
16 Energy consumer
20 Determination first operating parameters
21 Verification network-stable operation
22 Input quantity
23 Input quantity
24 Input quantity
25 First operating parameters
26 Control unit
27 Determination second operating parameters
28 Time control
29 Verification network-stable operation
30 Second operating parameters
31 Time delay
40 Power request
41 Power request
42 Power reserve
43 Total power request
44 Power potential
45 Power potential
46 Power potential

We claim:

1. A method for operating an electric island power network (10) having at least one energy generation plant (11, 12) based on renewable energy sources, at least one energy generation plant (13) based on conventional energy sources, at least one energy store (14) and at least one energy consumer (15, 16), the method comprising:

defining first operating parameters (25) for the island power network (10) in an event-controlled manner in a case in which a frequency of the island power network (10) and/or a voltage of the island power network (10) is outside defined limits, the first operating parameters (25) being defined such that operating the island power network (10) under the first operating parameters (25) causes the frequency of the island power network (10) and the voltage of the island power network (10) to both be within the defined limits;

defining second operating parameters (30) for the island power network (10) in a time-controlled manner after the expiration of a defined time span over which the frequency of the island power network (10) and the voltage of the island power network (10) have remained within the defined limits, the second operating parameters (30) being defined such that operating the island power network (10) under the second operating parameters (30) causing the island power network (10) to operate such that the island power network (10) is cost-optimally operated;

verifying, following the definition of the second operating parameters (30) for the cost-optimal operation of the island power network (10), as to whether the second operating parameters (30) ensure that the frequency of the island power network (10) and the voltage of the island power network (10) are still within the defined limits;

maintaining operation of the island power network (10) based on the second operating parameters (30) if it is verified that the frequency of the island power network (10) and the voltage of the island power network (10) are still within the defined limits; and discontinuing operation based on the second operating parameters (30) of the island power network (10) if the frequency of the island power network (10) and the voltage of the island power network (10) are outside of the defined limits such that the island power network (10) is not cost-optimally operated.

2. The method according to claim 1, wherein the first operating parameters (25) are determined so as to ensure a balance between a requested electric power and an available electric power, prioritizing the energy generation plants (11, 12, 13) and the at least one energy store (14).

3. The method according to claim 2, wherein
the at least one energy generation plant (11, 12) based on renewable energy sources is utilized with a higher priority for providing the requested electric power than the at least one energy store (14), and
the at least one energy store (14) is utilized with a higher priority for providing the requested electric power than the at least one energy generation plant (13) based on conventional energy sources.

4. The method according to claim 3, wherein
the requested electric power comprises an active power component and a reactive power component,
initially power potentials of the at least one energy generation plant (11, 12) based on renewable energy sources, then power potentials of the at least one energy store (14) and, if necessary, power potentials of the at least one energy generation plant (13) based on conventional energy sources are utilized for providing the active power component of the requested electric power,
in a case in which the reactive power provided deviates from the reactive power component of the requested electric power by more than a limit value, the provided reactive power is adjusted by changing the operation of the at least one energy store (14) so that the provided reactive power deviates from the reactive power component of the requested electric power by not more than the limit value.

5. The method according to claim 1, wherein
the first operating parameters (25) are determined heuristically.

6. The method according to claim 1, wherein
the second operating parameters (30) are determined through optimization of a cost function.

7. The method according to claim 6, wherein
during the optimization of the cost function the at least one energy generation plant (11, 12) based on renewable energy sources is always maximally utilized for providing the requested electric power, and with respect to the cost function, the costs of the at least one energy generation plant (11, 12) based on renewable energy sources are not taken into account.

8. The method according to claim 1, wherein
the second operating parameters (30) following a renewed definition of the first operating parameters (25) are only determined after expiration of a defined waiting time.

* * * * *